United States Patent [19]
Ulrich

[11] Patent Number: 6,006,467
[45] Date of Patent: Dec. 28, 1999

[54] WEEDLESS HOOK AND LURE HAVING LURE INTERCHANGEABILITY

[76] Inventor: Donald E. Ulrich, 1840 Cape Cod Cove, Grand Island, Fla. 32735

[21] Appl. No.: 09/211,488

[22] Filed: Dec. 15, 1998

[51] Int. Cl.[6] .................................................. A01K 83/00
[52] U.S. Cl. ........................ 43/43.16; 43/43.2; 43/42.38
[58] Field of Search ................................ 43/43.16, 43.2, 43/42.35, 42.37, 42.38, 42.36, 42.06

[56] References Cited

U.S. PATENT DOCUMENTS

| | | | |
|---|---|---|---|
| 1,706,881 | 3/1929 | Hampson | 43/43.16 |
| 2,016,960 | 10/1935 | Dillon . | |
| 2,101,491 | 12/1937 | Chilcott . | |
| 2,235,600 | 3/1941 | Ammerman . | |
| 2,266,725 | 12/1941 | Andrews | 43/44.8 |
| 2,325,107 | 7/1943 | Burns . | |
| 2,624,146 | 1/1953 | Kahle . | |
| 2,691,841 | 10/1954 | Daniel . | |
| 2,817,922 | 12/1957 | Takeshita . | |
| 3,186,123 | 6/1965 | Freeman . | |
| 3,748,774 | 7/1973 | Bryant . | |
| 3,755,952 | 9/1973 | Oliphant . | |
| 4,023,301 | 5/1977 | Warner | 43/42.25 |
| 4,232,470 | 11/1980 | Steffick, Jr. | 43/43.16 |
| 4,621,449 | 11/1986 | Nakagawa . | |
| 4,783,928 | 11/1988 | Weaver . | |
| 4,833,816 | 5/1989 | Sitton et al. . | |
| 4,835,898 | 6/1989 | Pond | 43/43.16 |
| 4,905,402 | 3/1990 | Clark | 43/43.16 |
| 5,083,394 | 1/1992 | Harwig | 43/43.16 |
| 5,379,544 | 1/1995 | Davidson . | |

Primary Examiner—Michael J. Carone
Assistant Examiner—James S. Bergin
Attorney, Agent, or Firm—Julian C. Renfro, Esq.

[57] ABSTRACT

A fishhook mounted for pivotal movement so as to be able to avoid entanglement with weeds or trash, this novel hook having an eye where a fishline may be attached and an upper shank portion extending at an angle downwardly from the eye. The hook also has a lower lure-receiving shank portion integral with the upper shank portion, with the upper and lower shank portions meeting in a curved shoulder portion forming an acute angle. This construction enables the lower shank portion to reside in a generally horizontal position when a lure has been inserted upon the lower shank portion with the head of the lure residing close to the curved shoulder portion and the hook is suspended from the eye. The end of the lower shank portion remote from the shoulder portion is provided with an upturned portion terminating in a point having a barb thereon. The eye forming the support for the hook and lure is normally located upwardly and forwardly of the lure, thus making it possible for the lure to weathervane, and face forwardly in a realistic manner. The weathervaning occurs whether the hook is utilized in an upright position with the lower shank portion of the hook inserted into an upper part of the lure, or the hook is utilized in an inverted position and the lower shank portion is inserted into a lower portion of the lure.

30 Claims, 6 Drawing Sheets

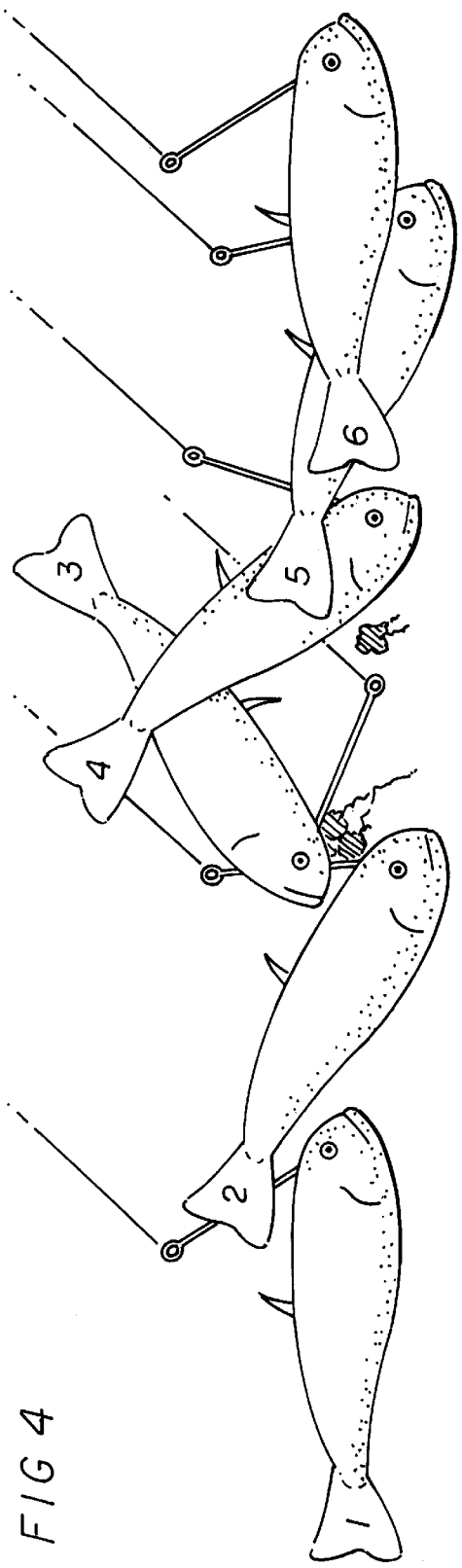
FIG 4
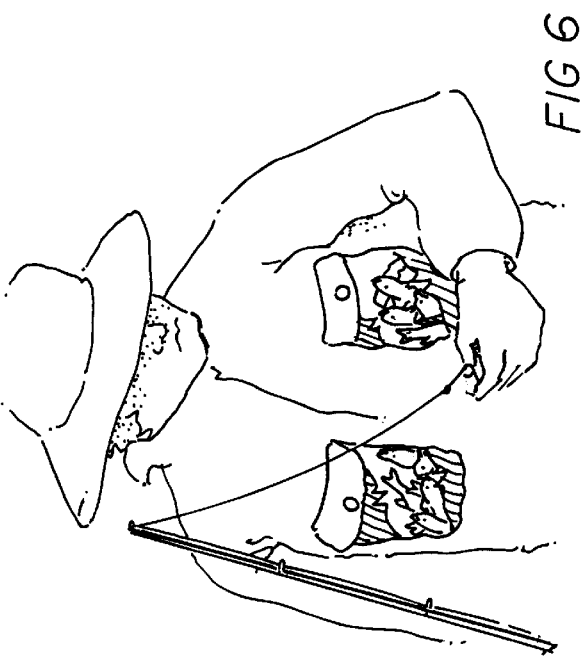
FIG 6
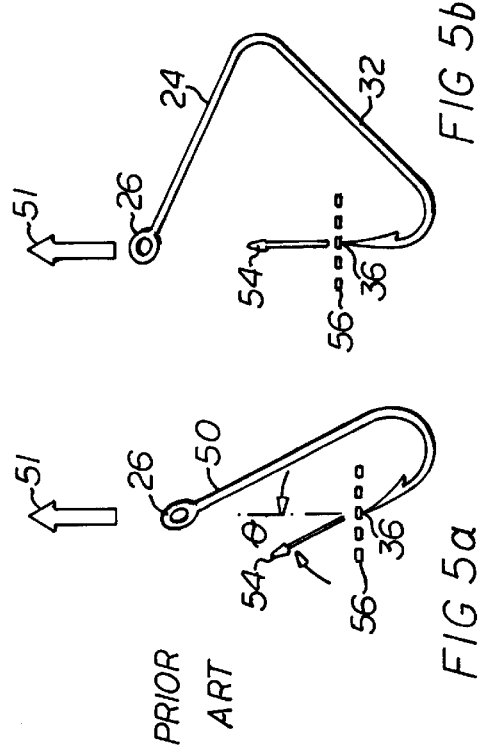
FIG 5b
FIG 5a
PRIOR ART

WEEDLESS HOOK AND LURE HAVING LURE INTERCHANGEABILITY

BACKGROUND OF THE INVENTION

In the fishing lure art, there has been a proliferation of various types of artificial lures having bodies made of soft, life-like plastic and imitating various types of natural baits, such as worms, night crawlers, grubs, toads, crawfish, minnows, etc. that form the prey of gamefish. These artificial lures are molded in a wide range of colors and specific shapes in an attempt to attract fish of particular types under the particular water and light conditions encountered by the fisherman.

Fishermen typically carry in a tackle box, the soft, plastic artificial lures described above and also hardbodied wood, metal or plastic artificial lures that typically resemble small fish or other creatures upon which larger gamefish prey. These hard bodied lures are also made in a wide range of colors and specific shapes to attract fish under various water and light conditions.

One type of lure design which has gained appreciable popularity is generally comprised of a body having the appearance of a minnow or shad, i.e., the body has a front head portion and a tail portion with simulated eyes, gills and fins and constructed of soft, life-like, resilient materials, such as plastic or latex. These have come to be more popular than hard bodied lures which are encumbered with fixed attachments of hooks, deflectors, etc. that detract from the lure's natural appearance and life-like behavior.

One of the oldest and most frustrating problems which confronts fishermen is the probability that the tug on the end of his fishing line is the engagement of a weed or other unwanted catch rather than a fish. This is the most common predicament in which a fisherman finds himself, given the fact that many fish are to be found in areas that contain weeds or other obstacles. If the point of a fish hook is exposed and dragged through the water, it is far more likely to snag debris than to catch a fish.

Various designs intended to render hooks weedless have been implemented. One common design in use today consists of light, flexible, strands of spring steel, affixed to the hook in such manner as to precede and guard the hook's point. Other designs have involved mechanical weed guards that were required to be set not unlike a mousetrap. However, sometimes the tension holding the weed guard in place would be too great and the mechanism would not disengage when struck by a fish. Conversely, if the tension were too weak, the mechanism would disengage without a fish strike. These types of lures are believed to no longer be readily available on the market.

I am aware of the existence of the Kahle U.S. Pat. No. 2,624,146 entitled "FISHHOOK" and I have noted he has placed particular emphasis on the configuration of his hook. This patentee has positioned the sharp point of his fishhook so that, using his words, the fish can strike his hook "from almost any direction with little or no interference from the shank of the hook." Kahle sets forth that the point of his hook is relatively far from the upper shank portion, with this distance being substantially greater than the distance from the point to the adjacent lower shank portion. This inventor specifically states in his Column 2 that "Extending laterally at an angle of more than 90° from the lower end of the upper shank portion there is a lower shank portion 13 which is slightly curved and terminates in a bend 15 having thereon a sharp point 16 with a barb 17." However, Kahle makes no mention of the use of a hook of a configuration involving a downwardly angled upper shank portion meeting at an acute angle with a generally horizontally disposed lower shank portion, such that the hook will provide a forwardly located support for a lure mounted on the lower shank portion. This patentee also makes no mention of lure interchangability, involving for example a lure of resilient plastic material permitting a degree of elongation along the longitudinal centerline of the lure, whereby upon the lure being stretched lengthwise to a slight extent, it can be readily installed on the lower shank portion of the hook, making use of a pocket provided in a hollow interior portion of the lure. He also says nothing about his lure having weedless qualities.

There is a distinct need for an improved hook-lure combination that will combine the attributes of attractiveness to a fish; ease of lure installation on the fishhook; tendency of the lure to "weathervane" so as to maintain a desired orientation; and an ability of the hook-lure combination to disengage itself from encountered weeds; and maintain a natural horizontal attitude at all times.

SUMMARY OF THE INVENTION

In accordance with this invention I have provided a fishhook mounted for pivotal movement so as to readily be able to prevent entanglement with encountered weeds or trash. My novel hook has an eye where a fishline may be attached, with this hook also having an upper shank portion extending at an angle downwardly and forwardly from the eye, as well as a lower, lure-receiving shank portion integral with the upper shank portion. The upper and lower shank portions meet in a curved forward shoulder portion forming an acute angle, such that the lower shank portion is able to reside in a generally horizontal position when a lure has been inserted upon the lower shank portion, with the head of the lure residing close to the curved forward shoulder portion and with the hook suspended from the eye. The end of the lower shank portion remote from the curved forward shoulder portion has an upturned portion terminating in a point having a barb thereon, which upturned point is intended to protrude from the rear of the lure. Quite significantly the upturned point is directed toward the eye of the fishhook, such that a pull on the fishline, after the fish has taken the bait, will likely cause the point of the hook to be driven upwardly and engage the fish's mouth. Because of the effective support location being forward of the center of the lure, my novel lure will have a distinct tendency to face forwardly in a highly advantageous manner.

It is a principal object of my invention to provide a novel hook designed to support a lure in a realistic, horizontal position, such that the lure will at all times be maintained in an attitude and orientation most likely to attract fish.

It is another object of this invention to provide a novel hook configuration involving a downwardly shank portion joining at an acute angle with a generally horizontally disposed shank portion adapted to receive a lure, with the effective support location being forward of the center of the lure so that the lure will have a distinct "weathervane" tendency, such that it will face forwardly in a most realistic attitude.

It is yet another object of this invention to provide a novel hook configuration involving a shank portion extending downwardly and forwardly from an eye portion intended to receive a fishing line, with such shank portion joining at an acute angle with a generally horizontally disposed shank portion adapted to receive a lure, with the effective support location being disposed upward and forward of the center of the lure so that the lure can readily tilt upwardly and rearwardly about the eye should a weed be encountered during fishing, with this tilting preventing the weed from becoming attached to the lure.

It is still another object of this invention to provide a novel hook configuration involving a generally horizontally disposed shank portion adapted either to be received in a pocket formed in a floating type of lure or, alternatively, to be inserted into a soft plastic lure of solid construction, with either type lure tending to weathervane and to face forward in a realistic manner.

It is yet still another object of this invention to provide a novel hook configuration involving a shank portion extending downwardly from an eye portion intended to receive a fishing line, with such shank portion joining at an acute angle with a generally horizontally disposed shank portion adapted to receive a lure, with the joinder of the downwardly extending portion with the horizontally extending portion forming a curved forward shoulder portion adapted to readily engage a lightweight lure, with this novel horizontally extending hook portion being readily insertable into a pocket-like portion formed in a lure, with this arrangement making lure interchangability readily possible.

It is yet still another object of this invention is to provide a novel hook configuration involving a shank portion extending downwardly and forwardly from an eye of the hook, with this downwardly extending shank portion providing an effective support location in the front of the lure, with the barb of the fishhook disposed upon a horizontally extending shank portion of the hook, and with the point of the hook directed toward the eye of the hook such that when the hook is taken into a fish's mouth, the barb is likely to move upwardly into firm engagement with the fish's mouth rather than tending to become readily disengaged from the fish's mouth.

These and other objects, features and advantages will become more apparent from a study of the appended specification and drawings.

BRIEF DESCRIPTION OF DRAWINGS

FIG. 4 may be regarded as a composite of a series of related views illustrating the ability of my novel hook-lure combination to readily circumvent obstructions, such as weeds, by virtue of its upward and forwardly located support, which permits the hook-lure combination to readily tilt upwardly and rearwardly about its forwardly located support point;

FIG. 5a is a view of a typical fishhook of the prior art, revealing how the point of the hook is directed away from the eye or support point of the hook;

FIG. 5b is a view of the novel hook in accordance with the instant invention, with it being apparent that the point of the hook is directed toward the eye or support point of the hook, with this highly advantageous configuration increasing the likelihood that the point of the hook will likely pierce the mouth of the fish taking the bait;

FIG. 6 is a view illustrating the fact that a fisherman may carry numerous lures in accordance with this invention in the pockets of his jacket without fear of the hookless lures becoming entangled;

DETAILED DESCRIPTION

Figure 1:
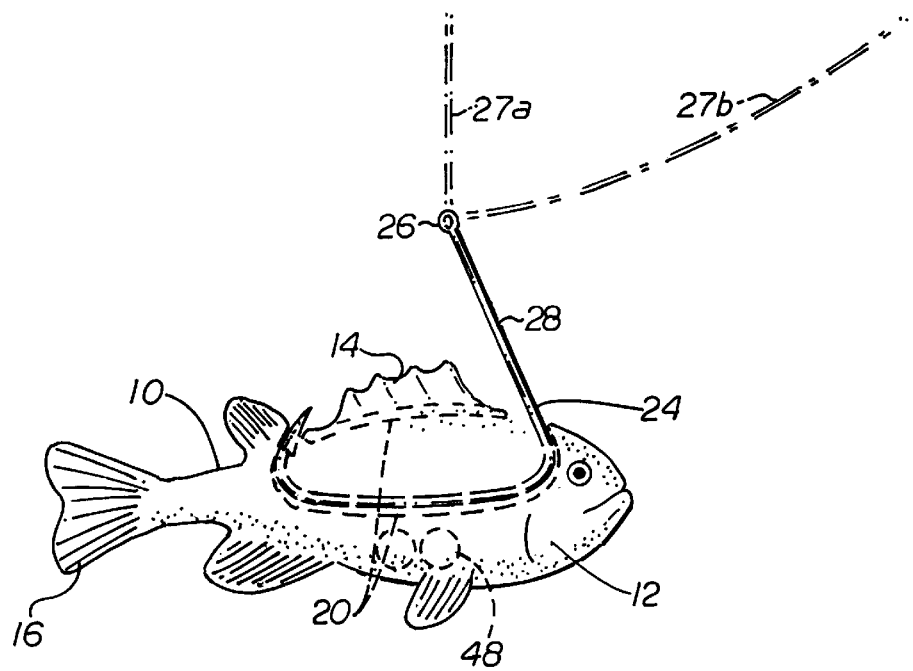
FIG. 1 is a view of my novel hook and lure in an operational relationship, with it to be noted that the lure is supported from above and forward of the center of the lure.

Initially referring to FIG. 1 it will be seen that I have shown a lure 10 resembling a small fish or minnow, with this lure having a head portion 12, a dorsal fin portion 14, and a tail portion 16. In a preferred portion of my invention the lure has a hollow portion or pocket 20 extending for a distance along a mid portion of the lure. It is into this hollow interior portion or pocket that a portion of my novel fishhook may be inserted.

Figure 2:
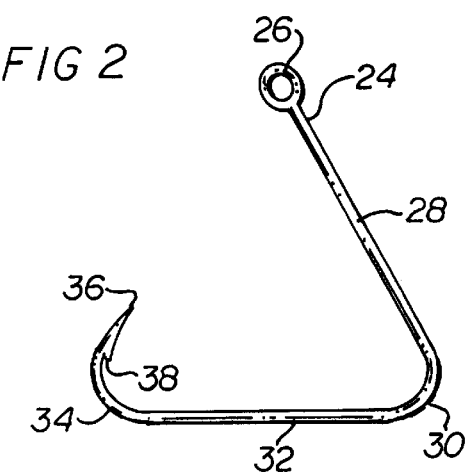
FIG. 2 is a view of a preferred embodiment of my novel fishhook, per se, revealing that this one-piece hook is principally constituted by a downwardly angled upper shank portion and a generally horizontally disposed lower shank portion, with these joined at an acute angle by a smoothly curved member.
Figure 2A:
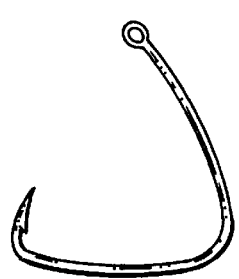
FIG. 2a is a view of an alternative construction of my novel hook, wherein the upper shank portion and the generally horizontally disposed lower shank portion are each of slightly curved construction.

The embodiment of my novel fishhook 24 depicted in FIG. 1 but in greater detail in FIG. 2 is revealed to involve an eye 26 intended to receive a fish line. The line 27a represents the lure at rest, whereas line 27b represents the line at the time the lure is being retrieved. Extending downwardly and forwardly at an angle from the eye 26 of the hook is an upper shank portion 28. The downwardly angled upper shank portion 28 joins a curved shoulder portion 30, when in turn joins a lower, generally horizontally extending lower shank portion 32. As will be discussed at greater length hereinafter, the downwardly angled upper shank portion 28 and the generally horizontally extending lower shank portion 32 may each be essentially straight, as illustrated in FIG. 2, or they may each possess a bit of curvature; note FIG. 2a.

From FIG. 2 it will be noted that the end of the lower shank portion 32 remote from the curved forward shoulder 30 forms an upwardly curved portion 34. The upwardly curved portion 34, which may be regarded as a second shoulder, has thereon a point 36 upon which a barb 38 is contained.

Although the shank portions 28 and 32 and the curved portions 30 and 34 associated therewith have been separately identified, it is to be understood that the hook 24 is made of single piece construction. Any material common to the trade, such as steel, is usually suitable.

It is important to note that the upper shank portion 28 and the lower shank portion 32 are joined at a significant angle, with the angle between the downwardly angled upper shank portion 28 and the generally horizontally disposed lower shank portion 32 is an acute angle in the range between 40° and 70°, typically approximately 63°. I am obviously not to be limited to this angle, however. It is also important to note that the length of the lower shank portion 32 extending between the shoulder 30 and the upwardly curved portion 34 is closely similar to the dimension of the pocket or slot in the lure with which it is to be used. This makes it relatively easy for a properly sized lure to be inserted snugly and rapidly upon the lower shank of the hook. Rapid lure interchangability is one of the important features of my invention.

The curved forward shoulder 30 is intended to be received adjacent the head portion 12 of the lure, whereas the upwardly curved point portion 34 is intended to be received adjacent the dorsal fin portion 14 of the lure, with the point 36 and the barbed portion 38 readily available to engage the mouth of a fish biting the lure. It is to be noted that the point 36 of my novel hook is aimed at the eye 26 of the hook.

It is significant that the shoulder 30 is in most instances intended to be located near the forward portion of the lure, with the eye 26 of the hook located above the forward portion of the lure, for this novel construction involves several distinct advantages.

First of all, such upwardly and forwardly located support location enables the lure, when put into use, to be able to act in a "weathervane" manner, such that the lure tends at all times to face forwardly when retrieved and into the current when motionlessly suspended, while at the same time the body of the lure remains in a realistic, generally horizontally disposed attitude.

Secondly, because of its support being upward and forward of the center of the lure, my novel lure can readily pivot about the eye 26 in the manner depicted in FIG. 4, so that a weed or piece of encountered trash can be readily released, subsequent to which the lure can resume a highly desirable, generally horizontally disposed position.

Thirdly, because the point 36 is aimed at the upwardly located eye 26 of the lure, the point 36 is positioned to be pulled by the fisherman directly into the mouth of the fish, thereby diminishing the chance of the fish shaking free of the hook.

Fourthly, the creation of a lower shank portion involving a pair of spaced shoulders readily lends itself to lure interchangability in that any of a series of different lures, each preferably equipped with a pocket or slot formed adjacent the dorsal fin, can be readily and snugly received upon my novel hook.

Fifthly, because of the fact that my lure is not encumbered with extraneous hooks and devices, it becomes readily possible for a fisherman to carry a pocketful of lures without danger of personal injury or entanglement inasmuch as each lure remains hookless until it has been inserted upon the lower shank portion of my novel hook.

It should be mentioned that in some instances it may be desirable to insert the hook into the lure such that the point is forward, this being appropriate when fishing for perch, which typically strike from the front of the lure. However, in this instance the weathervaning advantage may be curtailed.

Several different types of lures may be utilized with my novel hook, with one of these types being soft, resilient plastic lures which, when stretched, tend to readily return to their original position. In the instance this type of lure is to be used with my novel hook, a pocket or recess 20 is preferably formed in the upper portion of the plastic lure, into which the lower shank portion 32 of the hook 24 is inserted. I create the pocket or hollow portion 20, depicted in FIGS. 1 and 3, to have a length slightly smaller than the length of the lower shank portion extending between the two shoulders 30 and 34 of the hook, so that the lure can be stretched and then readily inserted upon the lower shank portion of the hook, and be expected to be retained thereon. Because of this advantageous arrangement, a fisherman can carry a variety of lures, and attach a hook to the selected lure just before the lure is to be put into use. Because the lures remain hookless, any entanglement of the lures is unlikely.

A type of lure ideally usable with my novel hook is a basically hollow lure, typically made of latex, the upper portion having a pocket into which the lower shank portion of the hook may be installed. This type of lure can be caused to submerge by use of small weights 48; note FIGS. 1 and 3. Importantly, this type of lure is readily stretchable, so that it can be secured upon the lower shank portion of the hook. As an alternative, the lower shank portion of my novel hook may be installed in a pocket in the lower portion of the hollow lure when the fisherman wishes to do bottom fishing; note FIG. 8b, or surface fishing; note FIG. 8a.

It is to be noted that my novel hook can also be inserted through the body of any a soft plastic lure now in common use, with the lure in such instance residing along the horizontally extending shank portion rather than dangling unrealistically from a conventional hook.

Figure 3:
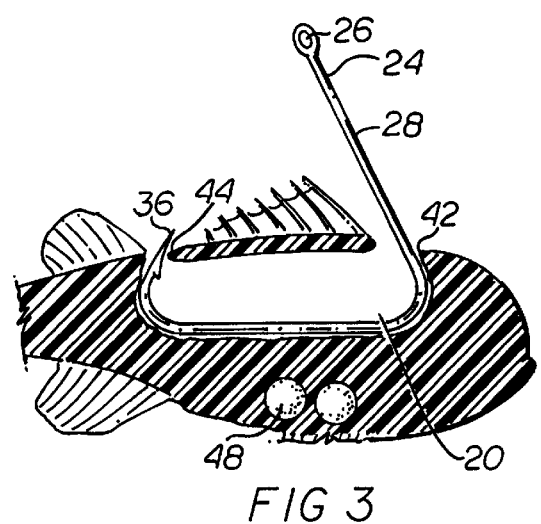
FIG. 3 is a view of the principal embodiment generally similar to FIG. 1 but with the lure shown in longitudinal cross section in order to reveal the utilization of a pocket or hollow portion making it possible to quickly install a selected lure in a close-fitting relationship with the lower, generally horizontally extending shank portion of the hook.

Turning now to FIG. 3, at this location I have shown a longitudinal cross-sectional view of a lure made of resilient material, with the hollow portion or pocket 20 being clearly visible. I provide a forward aperture 42 into which the point 36 of the hook is initially inserted, with the point thereafter emerging from the rear aperture 44. Because a soft, resilient plastic lure will, when stretched, tend to readily return to its original position when released, the lure will be safely retained in the position on the hook depicted in FIG. 3. In addition, the lower shank portion 32 of the hook resides under the dorsal fin portion 14, so there is little chance for the hook to become separated from the lure when the hook is pulled out of the pocket.

It was previously mentioned that in FIG. 3 I depict the use of one or a pair of small weights 48 in a lower portion of the lure. The use of one or more small weights may not be requirement, but with some lures such may be desirable in order to assure that the lure will remain in a proper attitude during use. When using hollow lures constructed of material such as latex, the lure may be converted from a floating lure to a submerged lure by the use of a small weight or two.

Turning now to FIG. 4, this figure may be regarded as a composite of a series of related views illustrating the ability of my novel hook-lure combination to readily avoid entanglement with an obstruction, such as a weed. This advantageous result is possible by virtue of the hook suspending the lure upwardly and forwardly of the center of the lure, which permits my novel hook-lure combination to readily tilt about and over the encountered obstruction.

It will be noted in FIG. 4 that I have applied a number to the tail of each of the several views constituting this figure, with Position 1 denoting the normal position of the lure, whereas with regard to Position 2, it is apparent that a piece of a weed or a piece of line has been encountered. The drag of the encountered obstruction is such as to cause the rear of the lure to tilt about the eye upwardly and thereafter forwardly about the obstruction, into the rotated attitude identified as Position 3. The tilting is sufficiently great that the lure is able to rid itself of the obstruction, which permits the gradual progression of the lure through Positions 4 and 5 and then return to the normal position identified as Position 6.

To be noted is the fact that the shank portion extending from the eye of the hook always precedes the point, which serves to prevent the point of the hook engaging an obstruction, such as a weed.

Turning now to FIG. 5a, this represents a view of a typical fishhook 50 of the prior art, revealing how the point of the hook is directed away from the eye or support point of the hook. It is quite apparent that the point of this conventional hook resides essentially parallel to the upper shank portion to which the eye is attached. In this figure I have utilized a relatively large arrow 51 representing the line of applied force from the eye of the hook 50, and a small arrow 54 representing the resulting and penetrating force of the hook point 36, which may be regarded as moving against a line of resistance 56. The angle Θ, designated 55, is significant to the efficiency of the hook 50. For example, if Θ is 30°, inasmuch as the cosine of 30° is 0.866, the efficiency of this prior art hook is 86.6%. This illustrates the fact that in this instance, the point of the hook does not move directly upward, but rather moves upwardly with a decided lateral component.

In contrast, in FIG. 5b I provide a view of my novel hook 24 in accordance with the instant invention, with it to be noted that the point of the hook 36 is directed toward the eye of the hook 26 at right angles to the line of resistance 56. It is to be observed that the point of the hook is in direct alignment with the small arrow 54 and with the relatively large upwardly directed arrow 51 disposed adjacent the eye of the hook. Utilizing this highly advantageous hook configuration, the angle Θ is zero, therefore the efficiency of the hook is 100%.

With reference to FIG. 6, this is a view illustrating the fact that a fisherman may carry numerous lures in accordance with this invention in the pockets of his jacket without fear of the hookless lures becoming entangled. Because of the advantageous construction of the lower shank portion of my novel hook, it is very easy for the fisherman to remove a lure from the hook and replace it with another one, that is more nearly suited for a particular type of fishing to be undertaken. Because I have essentially eliminated lures becoming entangled, it may be entirely unnecessary for the fisherman to be encumbered by having to transport a tackle box.

Figure 7A:
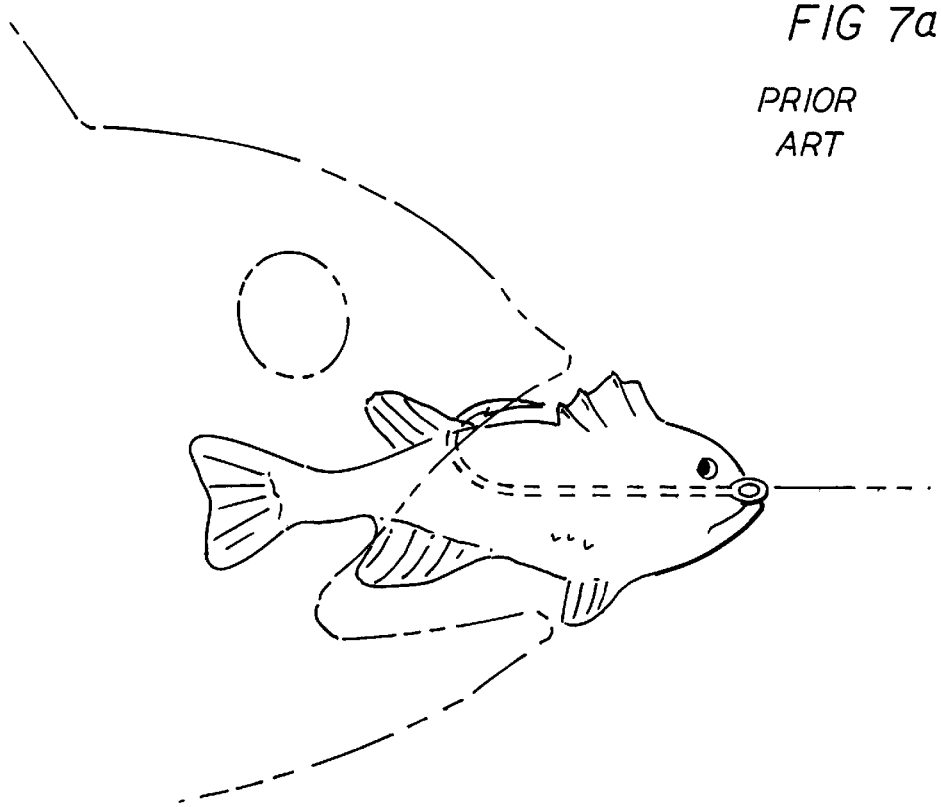
FIG. 7a is a view revealing that the configuration of a prior art hook is such that the point is positioned such that it may not necessarily engage the mouth of the fish taking the lure.

FIG. 7a is a view revealing that the configuration of a prior art hook is such that the point will not necessarily engage the mouth of the fish taking the lure. As is obvious, the pull is forward, and inasmuch as the point of this conventional hook in this instance is forwardly directed, it becomes readily possible for the fish to escape being hooked.

Figure 7B:
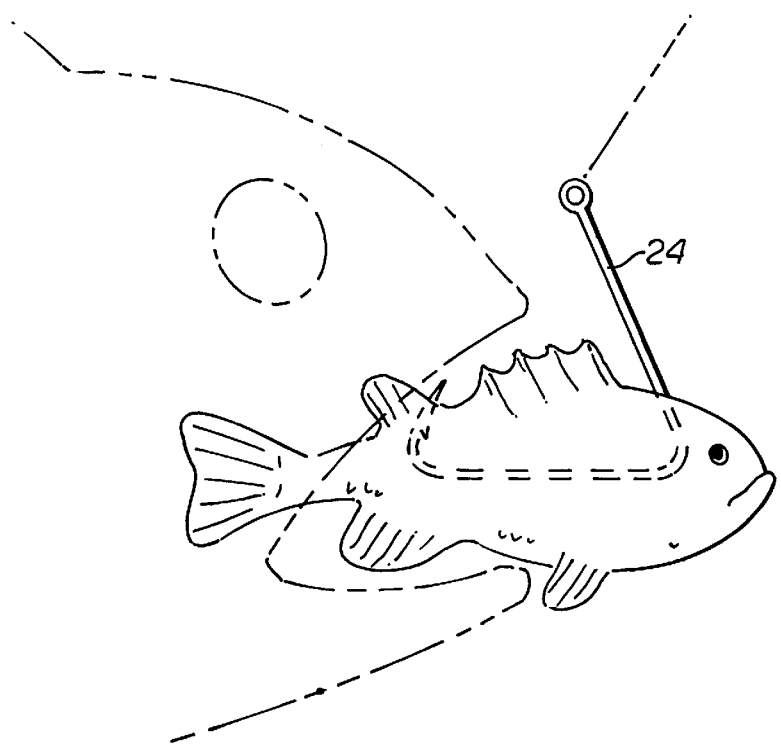
FIG. 7b is a view revealing the configuration of my novel hook which, because of its upwardly located support location, and the point of the hook directed toward the eye of the hook, will likely result in the point of the hook engaging and penetrating the mouth of the fish taking the lure.

FIG. 7b is a view revealing the configuration of my novel hook which, because of its upwardly located support location, and the point of the hook directed toward the eye of the hook, will likely result in the point of the hook engaging and penetrating the mouth of the fish taking the lure. It should be obvious that the point of my novel hook being directed upwardly will greatly increase the likelihood of the fish being hooked.

Figure 8A:
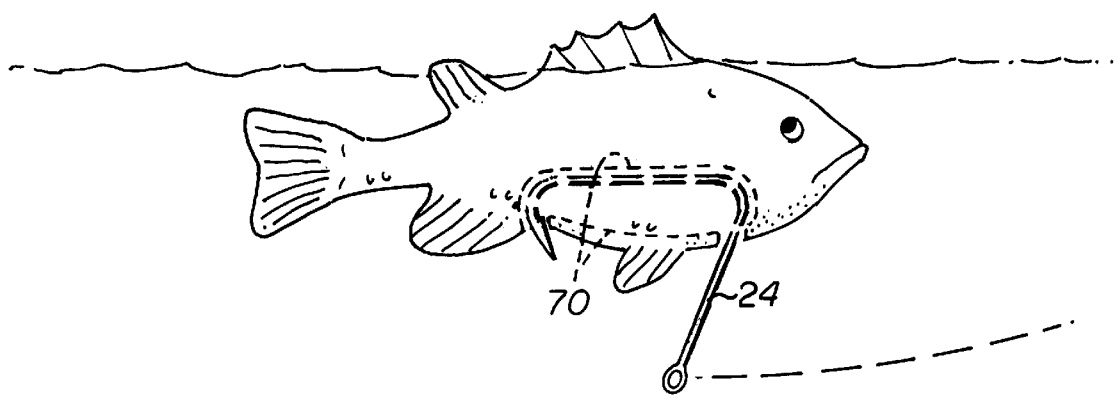
FIG. 8a is a view showing that my novel hook may be inserted in an inverted manner into a pocket provided in the belly portion of a slightly buoyant lure, such that the fisherman may engage in surface fishing.

FIG. 8a is a view showing that my novel hook may be inserted into a pocket 70 contained in the belly portion of a slightly buoyant lure, such that the fisherman may engage in surface fishing. The hook 24 of FIG. 8a is the same as the hook depicted in FIGS. 1 through 3, for example, except that what was previously described as the downwardly angled portion 28 obviously angles upwardly when the hook is inverted, but the point of the hook continues to point to the eye of the hook. It is to be noted that the previously listed advantages of weathervaning, the ability to release encountered trash, the likelihood of the point of the lure being driven deep into the fish's mouth, and lure interchangability are still obtained, despite the hook in this instance being utilized in an inverted position.

Figure 8B:
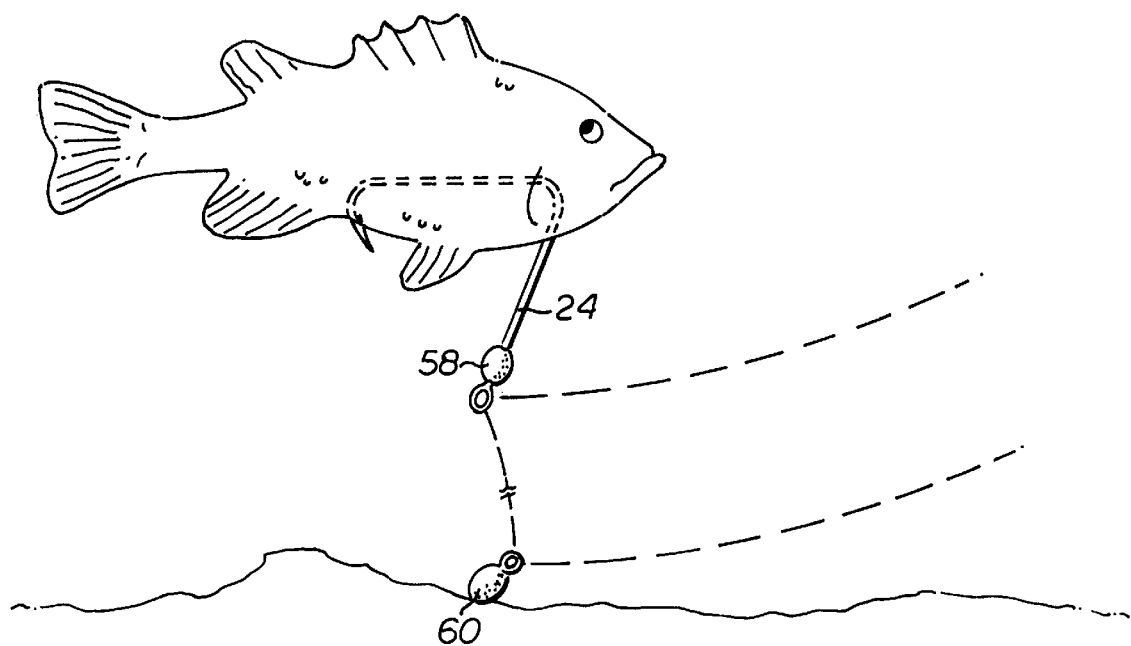
FIG. 8b is a view illustrating that when the fishhook is inserted into a pocket in the belly of a slightly buoyant lure and a small weight is added to the upper shank portion near the eye, my novel hook-lure combination becomes ideally suited for bottom fishing, with this view also revealing that an alternate weight may be utilized to maintain a desired distance from the bottom if so desired.

FIG. 8b is a view illustrating that when the fishhook is inserted into a pocket contained in the belly of a buoyant lure, it becomes ideally suited for bottom fishing, with a small weight 58 utilized to overcome the buoyancy of the lure. Also, when it is desired to keep the lure at a set distance from the bottom, an alternative weight 60 can be attached to the line.

Figure 9:
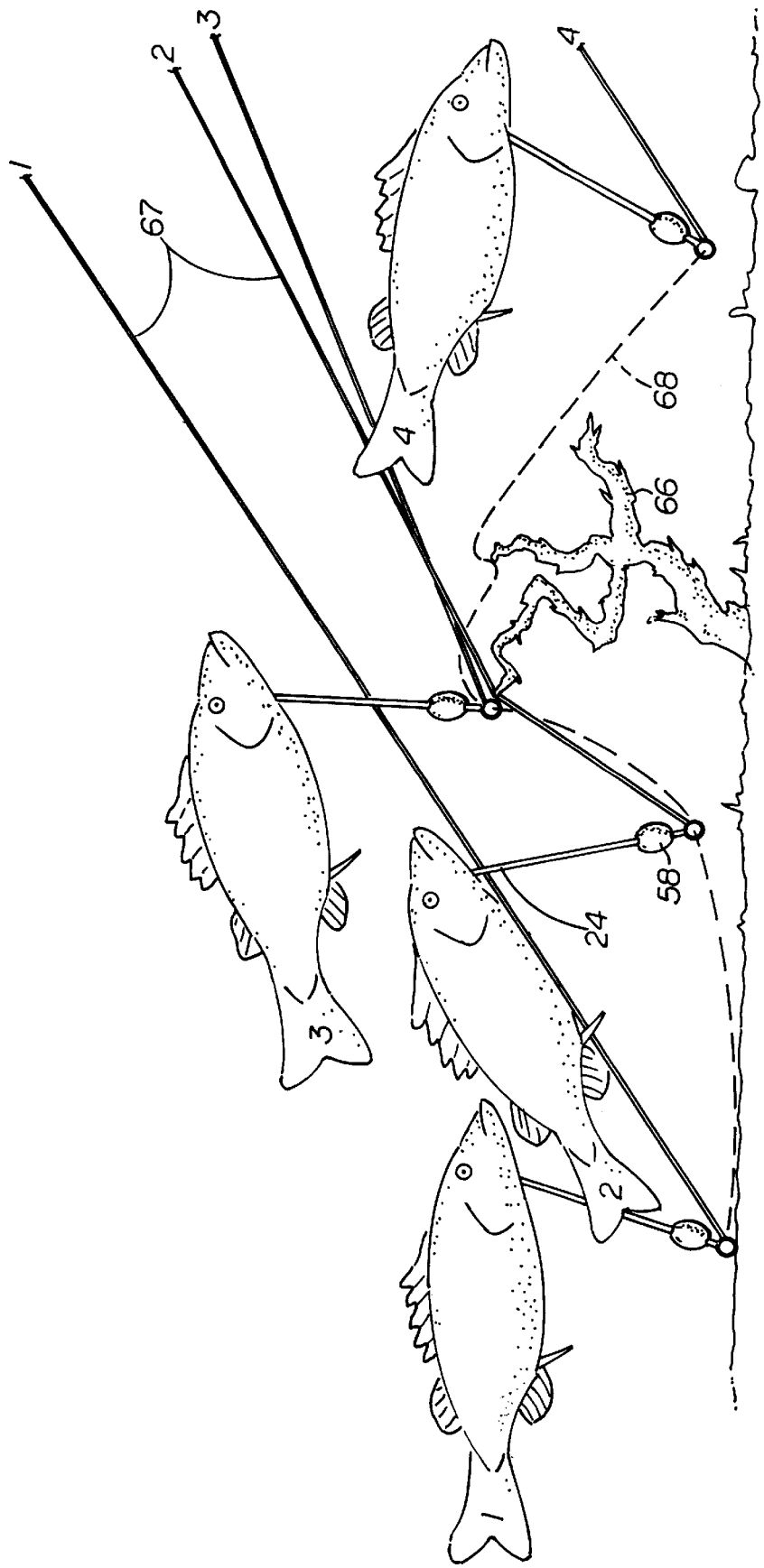
FIG. 9 may be regarded as a series of related views illustrating the ability of my novel hook-lure combination to readily circumvent an obstruction, even when the hook is utilized in an inverted position and inserted into the belly of a lure.

FIG. 9 may be regarded as a composite of a series of related views illustrating the ability of my novel hook-lure combination to readily avoid entanglement with an obstruction 66 residing on the bottom of the body of water, with this advantageous result being achieved even when the hook has been inserted into the belly of the lure. It will be noted in FIG. 9 that I have shown the fishing line 67 in four numbered positions, with each number coinciding with the number placed on the tail fin of the lure. By the utilization of a dashed line 68 I have shown the approximate path taken by the eye of the hook 24 as this part of the hook passes over the obstruction 66 without being entangled therewith. This highly desirable result is possible by virtue of the eye of the hook residing forwardly of the center of the lure, which permits my novel hook-lure combination to readily tilt about and over the encountered obstruction.

Figure 10:
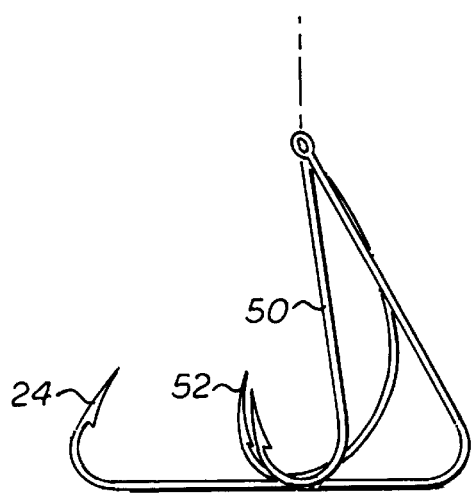
FIG. 10 is a composite view of three entirely different hooks with eye portions disposed in alignment, with this showing making possible a ready comparison of the different hook configurations.

In FIG. 10 I have shown three superimposed hooks with their eyes in alignment, with it being obvious that my novel hook 24 has a configuration distinctively different from the common hook 50, which is characterized by a long straight shank extending downwardly from the eye, and a U-shaped lower portion terminating with a point and barb residing essentially parallel to the long straight shank. As pointed out in FIGS. 5a and 7a, this type of hook has disadvantages that might prevent a fish being landed.

Continuing with FIG. 10, hook 52 represents a hook in the configuration described and illustrated in the earlier mentioned Kahle U.S. Pat. No. 2,624,146. Although Kahle is obviously concerned with the particular configuration of his hook, it is manifestly apparent that this patentee's hook does not utilize an upper shank portion and a lower shank portion joined at an acute angle, nor does his lower shank portion extend substantially horizontally so as to readily receive a selected lure whose upper portion (or whose lower portion) defines a pocket-like portion into which the lower shank portion of the hook can be quickly installed by a fisherman. The specification of the Kahle patent is entirely silent with regard to the utilization of a forward support such that the hook with an attached lure will be able to pivot about the eye of the hook in order that an encountered weed can be disengaged, or an encountered obstruction passed over. Furthermore, the Kahle Specification does not set forth that his hook with an attached lure can weathervane so as to always point in a forward direction. The numerous advantages of the instant hook are simply not available to the user of the Kahle hook.

Figure 11:
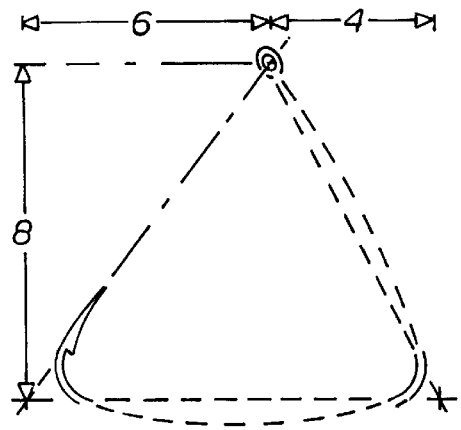
FIG. 11 is another view of a primary configuration of my novel hook, showing the preferred proportions of the hook.

With reference to FIG. 11 it will be noted that I have shown some ideal proportions of a hook 24 in accordance with my invention, with the utilization of these proportions assuring that the hook, when affixed in the upper portion of a lure, will pivot about the eye of the hook in the manner illustrated in FIG. 4 should a weed or other obstruction be encountered. The same proportions also apply when the hook is used in an inverted manner as depicted in FIGS. 8a, 8b and 9, with FIG. 9 depicting how the hook-lure combination can pivot when passing over an obstruction residing on the bottom of the body of water. FIG. 11 makes clear that the hook proportions apply irrespective of whether the upper and lower shank portions are straight, or have curvature. It is obvious that I am not to be limited to a hook utilizing the precise proportions set forth in this figure.

Figure 12:
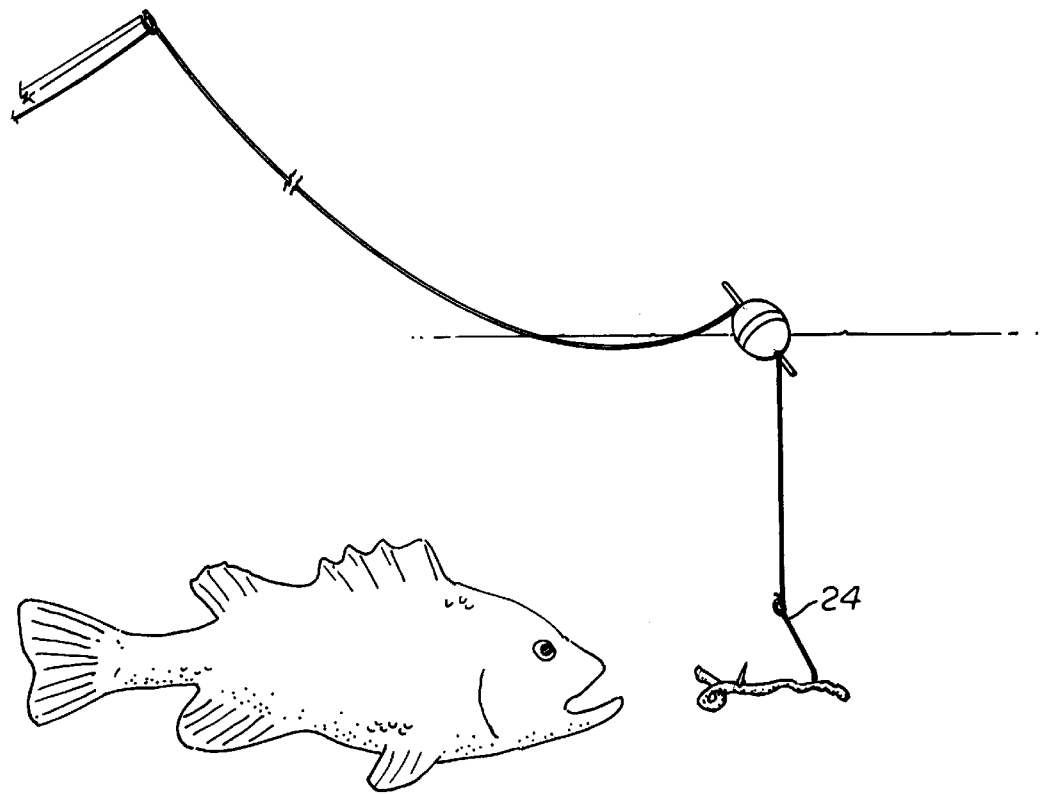
FIG. 12 is a view showing that my novel hook can readily be used with an ordinary fishing worm.

In FIG. 12 I have illustrated the use of my novel hook with an ordinary fishing worm, such as of soft plastic, with this figure revealing that by causing the relatively straight lower shank portion of my hook to extend through the body of the worm, the worm will be supported in a very realistic, generally horizontal attitude. The absence of a horizontally disposed lower shank portion from prior art hooks means that a worm will dangle essentially straight down from the hook, in a manifestly unrealistic attitude.

By now it should be apparent that the utilization of an upwardly and forwardly located support location for my novel hook enables an attached lure to be able to act in a "weathervane" manner, such that the lure tends at all times to face forwardly when retrieved and into a slight current when motionlessly suspended, while at the same time the body of the lure remains in a realistic, generally horizontally disposed attitude. When the hook is oriented such that its support is above and forward of the center of the lure, my novel hook-lure combination can readily pivot about the eye of the hook in the manner depicted in FIG. 4, so that entanglement with a weed or piece of encountered trash can be readily avoided, subsequent to which the lure can automatically resume a highly desirable, generally horizontally disposed attitude. Furthermore, because the point 36 is aimed at the eye 26 of the lure, the point is uniquely positioned to be pulled by the fisherman upwardly into the mouth of the fish, thereby diminishing the chance of the fish shaking free of the hook.

The many advantages of my novel hook-lure combination can be bestowed upon other lures of similar material, excepting of course the advantage of changeability.

The proper use of my hook-lure combination differs widely from the normal routine of cast and retrieve associated with prior art lures. For example, with a common lure having the line attached to the nose of the lure it is necessary to retrieve the lure at a rapid speed in order to maintain the lure in a natural horizontal attitude. This method will catch only the hunting, hungry, feeding fish.

The use of my novel hook-lure combination may involve the rate of retrieval being slow with periods of rest. This will catch the hunting, hungry, feeding fish as well as the lazy and contented fish.

Other variations on the novel configurations described and illustrated herein will be apparent to those skilled in the art, and I am not to be limited to the illustrated embodiments except as required by the scope of the appended claims.

I claim:

1. A fishhook mounted for pivotal movement so as to be able to avoid entanglement with weeds or trash, said hook being of generally triangular configuration and having an eye configured to receive a fishline, said hook also having a substantially straight upper shank portion commencing at said eye and extending at an angle downwardly and forwardly from said eye, and a lower, lure-receiving shank portion integral with said upper shank portion, said upper and lower shank portions meeting in a curved forward shoulder portion of small radius so as to form an acute angle, such that said lower shank portion is able to reside in a generally horizontal position when the hook is suspended from said eye and a lure has been inserted upon said lower shank portion with the head of the lure residing close to said curved forward shoulder portion, an end of said lower shank portion remote from said curved forward shoulder portion having a curved, upturned portion terminating in a point having a barb thereon, with the radius of curvature of said upturned portion being closely similar to the radius of curvature of said curved forward shoulder portion, said point of said upturned portion being directed toward and in substantial alignment with said eye, with the point on said upturned portion being intended to protrude from a rear location on the lure.

2. The fishhook mounted for pivotal movement as recited in claim 1 in which the angle between said upper shank portion and said lower shank portion is in the range of 40° to 70°.

3. The fishhook mounted for pivotal movement as recited in claim 1 in which the lure to be used with said hook is substantially hollow and has an interior portion adapted to receive said lower shank portion of said hook, with the length of the interior portion of the lure being similar to the length of said lower shank portion.

4. The fishhook mounted for pivotal movement as recited in claim 3 in which said interior portion adapted to receive said lower shank portion of said hook is formed in an upper portion of said lure.

5. The fishhook mounted for pivotal movement as recited in claim 3 in which said interior portion adapted to receive said lower shank portion of said hook is formed in a lower portion of said lure, with said hook being utilized in an inverted position.

6. The fishhook mounted for pivotal movement as recited in claim 1 in which the lure to be used with said hook is made of soft, resilient plastic, in an interior portion of which a pocket is created that is adapted to receive said lower shank portion of said hook, with the length of said pocket of said lure being slightly shorter than the length of said lower shank portion, such that said lure must be stretched slightly in order to install it on said lower shank portion of said hook.

7. The fishhook mounted for pivotal movement as recited in claim 6 in which said pocket is formed in an upper portion of said lure.

8. The fishhook mounted for pivotal movement as recited in claim 6 in which said pocket is formed in a lower portion of said lure, with said hook utilized in an inverted position.

9. The fishhook mounted for pivotal movement as recited in claim 1 in which said upper and lower shank portions of said hook are substantially straight.

10. The fishhook mounted for pivotal movement as recited in claim 1 in which said upper and lower shank portions of said hook possess curvature.

11. The fishhook mounted for pivotal movement as recited in claim 1 in which the effective support location for said hook is located forward of the center of said lower shank portion so that after a lure has been inserted on said lower shank portion with the head of the lure pointing forwardly, the lure will tend to weathervane, facing forwardly when retrieved, and into a slight current when motionlessly suspended, while at the same time the body of the lure remains in a realistic, generally horizontally disposed attitude.

12. A fishhook mounted for pivotal movement so as to be able to avoid entanglement with weeds or trash, said hook having an eye where a fishline may be attached, said hook also having a substantially straight upper shank portion commencing at said eye and extending at an angle downwardly and forwardly from said eye, and a lower lure-receiving shank portion integral with said upper shank portion, said upper and lower shank portions intersecting at an acute angle, with a first shoulder formed at a forward location on said fishhook, at the intersection of said upper and lower shank portions, said lower shank portion being able to reside in a generally horizontal position when said hook is suspended from said eye, said lower shank portion having a forward end and a rearward end, with said rearward end of said lower shank portion having an upturned portion terminating in a point equipped with a barb, with said upturned portion forming a second shoulder, the distance between said shoulders substantially coinciding with the length of an interior portion of a lure to be used with said hook, so that a lure inserted upon said lower shank portion can be retained between said shoulders, said point formed on said upturned portion being intended to protrude from a rear location of the inserted lure.

13. The fishhook mounted for pivotal movement as recited in claim 12 in which the lure to be used with said hook is substantially hollow with a pocket defined in said interior portion that is adapted to receive said lower shank portion of said hook, with the length of said pocket being similar to the length of said lower shank portion.

14. The fishhook mounted for pivotal movement as recited in claim 13 in which said pocket for receiving said lower shank portion of said hook is formed in an upper portion of said lure.

15. The fishhook mounted for pivotal movement as recited in claim 13 in which said pocket for receiving said lower shank portion is formed in a lower portion of said lure, with said hook being utilized in an inverted position.

16. The fishhook mounted for pivotal movement as recited in claim 12 in which the lure to be used with said hook is made of soft, resilient plastic, in the interior portion of which a pocket is created, with the length of said pocket being slightly shorter than the length of said lower shank portion of said hook, such that the lure must be stretched slightly in order to install it on said lower shank of said hook.

17. The fishhook mounted for pivotal movement as recited in claim 16 in which said pocket is formed in an upper portion of said lure.

18. The fishhook mounted for pivotal movement as recited in claim 16 in which said pocket is formed in a lower portion of said lure, with said hook utilized in an inverted position.

19. The fishhook mounted for pivotal movement as recited in claim 12 in which said point of said hook is directed toward and in substantial alignment with said eye.

20. The fishhook mounted for pivotal movement as recited in claim 12 in which the angle between said upper shank portion and said lower shank portion is in the range of 40° to 70°.

21. The fishhook mounted for pivotal movement as recited in claim 12 in which said upper and lower shank portions are substantially straight.

22. The fishhook mounted for pivotal movement as recited in claim 12 in which said upper and lower shank portions possess curvature.

23. The fishhook mounted for pivotal movement as recited in claim 12 in which the effective support location for said hook is located forward of the center of said lower shank portion so that after a lure has been inserted on said lower shank portion with the head of the lure pointing forwardly, the lure will tend to weathervane, facing forwardly when retrieved, and into a slight current when motionlessly suspended, while at the same time the body of the lure remains in a realistic, generally horizontally disposed attitude.

24. A fishhook particularly adapted for use in connection with a lure having a head portion, a dorsal fin portion, and an interior portion that is at least partially hollow, said fishhook having an upper substantially straight shank portion terminating in an eye at a free end, said upper shank portion extending at an angle downwardly and forwardly from said eye, with said upper shank portion being joined to a lower substantially straight shank portion terminating in an upwardly curved point portion having thereon a barb, said upper and lower shank portions being joined at an angle such that a curved forward shoulder is formed, the length of said lower shank portion extending between said curved forward shoulder and said upwardly curved point portion being similar to the length of the lure whose hollow interior portion is intended to receive said lower shank portion, said curved forward shoulder being intended to be received adjacent the head portion of the lure, and said upwardly curved point portion being intended to be received adjacent the dorsal fin portion of the lure, with the barb available to engage the mouth of a fish biting said lure.

25. The fishhook particularly adapted for use in connection with a lure as recited in claim 24 in which the angle between said upper and lower shank portions is in the range between 40° and 70°.

26. The fishhook particularly adapted for use in connection with a lure as recited in claim 24 wherein said lure is made of a plastic material permitting a degree of elongation along the longitudinal centerline of the lure, whereby the lure must be stretched lengthwise to a slight extent to permit the installation of the lower shank portion of the hook in the hollow interior portion of the lure.

27. The fishhook mounted for pivotal movement as recited in claim 26 in which said interior portion adapted to receive said lower shank portion of said hook is formed in an upper portion of said lure.

28. The fishhook mounted for pivotal movement as recited in claim 26 in which said interior portion adapted to receive said lower shank portion of said hook is formed in a lower portion of said lure, with said hook being utilized in an inverted position.

29. The fishhook mounted for pivotal movement as recited in claim 24 in which said upwardly curved point portion is directed toward and in substantial alignment with said eye.

30. The fishhook mounted for pivotal movement as recited in claim 24 in which the effective support location for said hook is located forward of the center of said lower shank portion so that after a lure has been inserted on said lower shank portion with the head of the lure pointing forwardly, the lure will tend to weathervane, facing forwardly when retrieved, and into a slight current when motionlessly suspended, while at the same time the body of the lure remains in a realistic, generally horizontally disposed attitude.

* * * * *